(12) United States Patent
Yamamoto et al.

(10) Patent No.: US 10,793,748 B2
(45) Date of Patent: Oct. 6, 2020

(54) COATING COMPOSITION, METHOD FOR PRODUCING SAME, COATING FILM, EXHAUST FAN AND AIR CONDITIONER

(71) Applicant: MITSUBISHI ELECTRIC CORPORATION, Chiyoda-ku (JP)

(72) Inventors: Yoshinori Yamamoto, Chiyoda-ku (JP); Shigeru Utsumi, Chiyoda-ku (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 165 days.

(21) Appl. No.: 15/564,337

(22) PCT Filed: Feb. 10, 2016

(86) PCT No.: PCT/JP2016/053924
§ 371 (c)(1),
(2) Date: Oct. 4, 2017

(87) PCT Pub. No.: WO2016/181676
PCT Pub. Date: Nov. 17, 2016

(65) Prior Publication Data
US 2018/0142129 A1    May 24, 2018

(30) Foreign Application Priority Data

May 14, 2015 (JP) ................................. 2015-098887

(51) Int. Cl.
| | | |
|---|---|---|
| C09D 201/04 | (2006.01) | |
| B05D 7/24 | (2006.01) | |
| C09D 5/00 | (2006.01) | |
| C09D 7/40 | (2018.01) | |
| C09D 7/62 | (2018.01) | |
| F24F 1/06 | (2011.01) | |
| C09D 7/61 | (2018.01) | |
| C08K 3/36 | (2006.01) | |
| F24F 1/14 | (2011.01) | |
| F24F 1/58 | (2011.01) | |
| C08K 9/06 | (2006.01) | |
| B05D 5/08 | (2006.01) | |
| F24F 1/38 | (2011.01) | |

(52) U.S. Cl.
CPC ............ *C09D 201/04* (2013.01); *B05D 7/24* (2013.01); *C09D 5/00* (2013.01); *C09D 7/61* (2018.01); *C09D 7/62* (2018.01); *C09D 7/67* (2018.01); *F24F 1/06* (2013.01); *B05D 5/083* (2013.01); *B05D 2401/21* (2013.01); *B05D 2506/10* (2013.01); *B05D 2601/22* (2013.01); *C08K 3/36* (2013.01); *C08K 9/06* (2013.01); *C08K 2201/003* (2013.01); *F24F 1/14* (2013.01); *F24F 1/38* (2013.01); *F24F 1/58* (2013.01)

(58) Field of Classification Search
None
See application file for complete search history.

(56) References Cited

U.S. PATENT DOCUMENTS

| | | | | |
|---|---|---|---|---|
| 6,723,439 | B2* | 4/2004 | Amidaiji | C08K 3/36 428/447 |
| 6,761,673 | B2* | 7/2004 | Shudo | C08J 5/128 399/122 |
| 7,537,803 | B2* | 5/2009 | Wang | A61K 9/5089 427/212 |
| 2002/0146575 | A1* | 10/2002 | Shudo | C08J 5/128 428/447 |
| 2002/0197490 | A1 | 12/2002 | Amidaiji et al. | |
| 2012/0135244 | A1* | 5/2012 | Yuki | B05D 5/00 428/414 |
| 2015/0337156 | A1 | 11/2015 | Izutani et al. | |
| 2018/0142129 | A1* | 5/2018 | Yamamoto | B05D 7/24 |

FOREIGN PATENT DOCUMENTS

| | | |
|---|---|---|
| JP | 2001-181509 A | 7/2001 |
| JP | 2003-208477 A | 7/2003 |
| JP | 2004-106188 A | 4/2004 |
| JP | 2007-16096 A | 1/2007 |
| JP | 2008-69365 A | 3/2008 |
| JP | 2008-302266 A | 12/2008 |
| JP | 2012-187529 A | 10/2012 |
| JP | 2012-188565 A | 10/2012 |
| JP | 2015-155512 A | 8/2015 |
| WO | WO 2013/179457 A1 | 12/2013 |
| WO | WO 2014/106922 A1 | 7/2014 |

OTHER PUBLICATIONS

International Search Report dated May 10, 2016, in PCT/JP2016/053924 filed Feb. 10, 2016.

* cited by examiner

Primary Examiner — Joseph D Anthony
(74) Attorney, Agent, or Firm — Xsensus LLP (57) ABSTRACT

Provided is a coating composition containing: water; a water-soluble organic solvent that has a flash pint of at least 80° C. and not more than 200° C. and dissolves a fluorine resin; a fluorine resin; hydrophilic silica particles; and hydrophobic silica particles. The hydrophilic silica particles are preferably contained in the coating composition in an amount of at least 0.001 mass % and not more than 1 mass %. The average particle diameter of the hydrophilic silica particles is preferably at least 5 nm and not more than 30 nm.

7 Claims, 2 Drawing Sheets

COATING COMPOSITION, METHOD FOR PRODUCING SAME, COATING FILM, EXHAUST FAN AND AIR CONDITIONER

TECHNICAL FIELD

This invention relates to a coating composition, a method for producing same, a coating film, an exhaust fan and an air conditioner.

BACKGROUND ART

Conventionally, many water-repellent surfaces have been obtained by treating surfaces with a water repellent such as silicon and fluorine, and water repellency with contact angles with water of about 100° to 110° has been achieved on clothing, automobile glass, painted surfaces and the like. Recently, it has been discovered that surfaces with extremely high water repellency (super water repellency) with contact angles of 150° or more can be obtained by giving a suitable structure to a low-energy surface.

When water droplets adhere to electrical power lines and the like, moreover, the conically hanging water droplets are likely to cause discharge, sometimes leading to transmission loss. The amount of discharge is greater in the winter, when the water droplets hang down in the form of icicles with pointed ends. Moreover, in snowy regions roofs may become deformed from the weight of accumulated snow. Antennae in snowy regions are also subject to transmission problems such as reduced electric field strength due to accumulated ice and snow.

In the case of exhaust fans, water droplets adhere to fan blade surfaces particularly in bathrooms and other high-humidity environments, making dust adhesion more likely. During long-term operation, this can lead to problems such as reduced air volume and increased noise.

As heat pump-type air conditioners have spread rapidly in recent years, outdoor units are being installed not only in cold regions as in the past, but also in extremely cold regions (with outdoor air temperatures of 0° C. or less). In extremely cold regions, the surface temperatures of the outdoor heat exchanger and case reach 0° C. or less, the same as the outdoor air temperature. Therefore, the water vapor generated during defrosting operations may remain inside the case and re-freeze on the case itself. Snow is particularly likely to adhere to the heat exchanger in cold regions where the outdoor air temperature is low, and more drain water and water vapor are produced under high-humidity conditions and during high-performance operations because frost accumulates on the heat exchanger. When the water vapor freezes, the resulting ice is not melted by defrosting operations, and as defrosting is repeated the ice continues to re-freeze and grow, sometimes forming icicles. Blown-in snow also accumulates and may become packed or freeze solid. The water vapor generated during defrosted operations is particularly likely to persist and adhere to the propeller fan because the flow of air is less there than in other parts of the unit when the fan is restarted after defrosting. As a result, water vapor adhering to the boss and blades of the propeller fan is likely to freeze solid, and the ice is likely to grow. The mass of ice and snow on the boss and blades may also be enlarged by sucked-in snow. This mass of ice and snow becomes larger and larger without melting if the weather remains bad and extremely low temperatures persist. In such cases the rotation of the propeller fan may become eccentric, exerting strain on the screw fixtures in some cases. The desired air flow also may not be obtained in some cases because the propeller fan becomes too heavy.

Thus, to prevent a reduction in the performance of various articles, much research is being done into preventing adhesion of water droplets, frost, snow, ice and the like by making the surfaces of the articles water repellent or super water repellent. Various methods have already been disclosed for preparing water repellent surfaces or super water repellent surfaces.

Patent Document 1 describes a super water repellent member wherein the surface of a substrate is covered with a cured product of a mixture containing particles of a hydrophilic inorganic matter and an emulsion of an organic matter having a particle size smaller than that of the inorganic matter and having an average particle size of 0.01 to 1 μm, and wherein the content of the particles of the inorganic matter in the mixture is 300 to 1,000 parts by volume per 100 parts by volume of a dried product of the emulsion of the organic matter.

Patent Document 2 describes a super water repellent composition comprising hydrophobically treated inorganic fine particles with a primary average particle diameter of not more than 100 nm, an organic silicon compound, and an organic solvent that dissolves the organic silicon compound and has a boiling point of 50° C. to 150° C. at $1.013 \times 10^2$ kPa and an evaporation latent heat of 0.2 to 1.3 kJ/g.

Patent Document 3 describes a water-dilutable spray water repellent having super water repellency, consisting of hydrophobic metal oxide fine particles with an average particle diameter of 5 to 20 nm, silicone oil in an amount of 0.1% to 10% by weight of the fine particles, a wax and/or paraffin as a binder for the fine particles in an amount of 0.1% to 10% by weight or the fine particles, an aqueous solvent in an amount of 1 to 15 parts by weight per 1 part by weight of the fine particles, and water in an amount of 10 to 80 parts by weight per 1 part by weight of a mixture of the fine particles, silicone oil, binder and aqueous solvent.

Patent Document 1: Japanese Patent Application Laid-open No. 2004-106188
Patent Document 2: Japanese Patent Application Laid-open No. 2003-206477
Patent Document 3: Japanese Patent Application Laid-open No. 2008-69365

SUMMARY OF THE INVENTION

Technical Problem

However, in Patent Document 1 the problem has been that adequate super water repellency is not obtained because surfactant retrains in the dried product of the emulsion of the organic matter.

In Patent Document 2, the problem has been that adequate super water repellency is not obtained because the organic solvent has a rapid drying speed, send the super water repellent composition is likely to be affected by the surrounding environment during the coating process, resulting in cracks and defects after drying under high-temperature, low-humidity conditions.

In Patent Document 3, the problem has been that adequate super water repellency is not obtained because the repellent contains water and therefore has poor coating properties on water-repellent surfaces such as plastic.

It is an object of the present invention, which was developed with the aim of solving these problems, to provide a coating composition that is easy to handle and forms a coating film that can confer super water repellency with few cracks.

Solution to the Problem

This invention is a coating composition containing: water; a water-soluble organic solvent that has a flash point of at least 80° C. and not more than 200° C. and dissolves a fluorine resin; a fluorine resin; hydrophilic silica particles; and hydrophobic silica particles.

Advantageous Effects of the Invention

With the present invention, it is possible to provide a coating composition that is easy to handle and can form a coating film that confers super water repellency with few cracks.

DESCRIPTION OF EMBODIMENTS

First Embodiment

Figure 1:
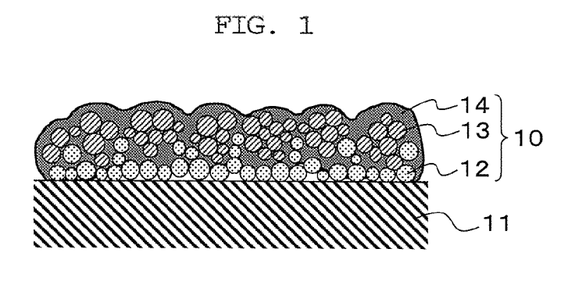
FIG. 1 is a model cross-section of a coating film formed from the coating composition of a first embodiment.

The coating composition of the first embodiment of this invention contains: water; a water-soluble organic solvent that has a flash point of at least 80° C. and not more than 200° C. and dissolves a fluorine resin; a fluorine resin; hydrophilic silica particles; and hydrophobic silica particles as essential components. FIG. 1 is a model cross-section of a coating film formed by coating and drying the coating composition of the first embodiment on a substrate. In FIG. 1, a coating film (water-repellent film) 10 is formed on a substrate 11, and is composed of lipophilic silica particles 12, hydrophobic silica particles 13 and a fluorine resin 14. Because the hydrophilic silica particles 12 are dispersed well in water and water-soluble organic solvents and are strongly cohesive, they are likely to collect on the surface of the substrate 11 during the process of coating and drying the coating composition on the substrate 11, forming a layer of the hydrophilic silica particles 12. The layer of the hydrophilic silica particles 12 then serves as an adhesive between the substrate 11 on the one hand and the hydrophobic silica particles 13 and fluorine resin 14, which provide water repellency. This results in a coating film 10 that is free of cracks and defects and has excellent super water repellency and high durability.

The fluorine resin 14 used in the coating composition of this embodiment is a component that both confers water repellency on the coating film 10 and acts as a binder that provides adhesiveness between the substrate 11 and the coating film 10. The fluorine resin 14 is not particularly limited, and resins that are known in the technical field may be used. Specific examples of the fluorine resin 14 include fluoroethylene/vinyl ether (FEVE) alternating copolymers, fluoroethylene-vinyl ester (FEVES), polytetrafluoroethylene (PTFE), tetrafluoroethylene-hexafluoropropylene copolymer (FEP), tetrafluoroethylene-perfluoroalkyl vinyl ether copolymer (PFA), ethylene-tetrafluoroethylene copolymer (ETFE), ethylene-chlorotrifluoroethylene copolymer (ECTFE), polyvinylidene fluoride (PVDF), polychlorotrifluoroethylene (PCTFE) and polyvinyl fluoride (PVF). These fluorine resins 14 may be used individually, or a combination of two or more may be used. These fluorine resins 14 may also be mixed with other resins. Of these, a fluoroethylene/vinyl ether (FEVE) alternating copolymer is preferred from the standpoint of solubility in the water-soluble organic solvent and adhesiveness with the substrate 11 when forming the coating film 10.

The content of the fluorine resin 14 in the coating composition of this embodiment is not particularly limited, but is preferably at least 0.5 mass % and not more than 10 mass %, or more preferably at least 2 mass % and not more than 8 mass %. If the content of the fluorine resin 14 is less than 0.5 mass %, adequate adhesion may not be obtained between the substrate 11 and the coating film 10, and the water repellent properties conferred by the fluorine resin 14 any not be adequately realized. If the content of the fluorine resin 14 exceeds 10 mass %, on the other hand, the film thickness of the coating film 10 becomes too large, adversely affecting the adhesion between the substrate 11 and the coating film 10.

The hydrophilic silica particles 12 used in the coating composition of this embodiment are a component that forms a layer on the surface of the substrate 11 because it is strongly cohesive, and serves as an adhesive between the fluorine resin 14 and hydrophilic silica particles 13 on the one hand and the substrate 11 on the other hand. Hydrophilic silica particles 12 with an average particle diameter of at least 5 nm and not more than 30 nm are particularly desirable because they are extremely cohesive. The average particle diameter of the hydrophilic silica particles 12 here is an average particle diameter according to laser light scattering measurement. If the average particle diameter of the hydrophilic silica particles 12 exceeds 30 nm, they are less likely to act as a binder, the strength of the formed coating film 10 is likely to be lower and cracks are likely. On the other hand, an average particle diameter of the hydrophilic silica particles 12 of less than 5 nm is not desirable because the hydrophilic silica particles 12 are likely to aggregate with each other, and are thus not able to serve as an adhesive with the substrate 11.

The hydrophilic silica particles 12 are not particularly limited, and particles that are known in the technical field may be used. Specific examples include Snowtex®-XL, Snowtex®-YL, Snowtex®-ZL, PST-2, Snowtex®-20, Snowtex®-30, Snowtex®-C, Snowtex®-O, Snowtext®-OS, Snowtex®-OL and Snowtex®-50 from Nissan Chemical Industries, Ltd.; Adelite AT-30, Adelite AT-40 and Adelite AT-50 from ADEKA Corporation; and Cataloid SI-550 Mid Cataloid SI-50 from JGC Catalysts and Chemicals Ltd. and the like.

the content of the hydrophilic silica particles 12 in the coating composition of this embodiment is preferably at least 0.001 mass % and not more than 1 mass %, or more preferably at least 0.01 mass % and not more than 0.8 mass % of the coating composition. If the content of the hydrophilic silica particles 12 is less than 0.001 mass %, it becomes more difficult to form a continuous layer of the hydrophilic silica particles 12 on the surface of the substrate 11, and adequate adhesion may not be obtained between the substrate 11 on the one hand and the fluorine resin 14 and hydrophobic silica particles 13. If the content of the hydrophilic silica particles 12 exceeds 1 mass %, on the other hand, the hydrophilic silica particles 12 are likely to precipitate on the outermost surface of the coating film 10, detracting from the super water repellency.

The hydrophobic silica particles 13 used in the coating composition of this embodiment are a component that gives a relief structure to the surface of the coating film 10, thereby improving water repellency by reducing the contact area with water droplets. The hydrophobic silica particles 13 are not particularly limited, and particles known in the technical field may be used. Specifically, hydrophilic silica particles that have been hydrophobically treated may be used as the hydrophobic silica particles 13.

The hydrophilic silica particles that are hydrophobically treated are not particularly limited, and various silica particles produced by a dry process (such as combustion), wet process (such as the sol-gel or precipitation method) or the like may be used. The silica particles may also be partly or wholly molten silica particles. Dry silica here is also called fumed silica, and can generally be produced by combusting a silicon compound such as silicon tetrachloride in an oxyhydrogen flame. With dry silica, particles with a specific surface area in the range of about 50 to 500 $m^2/g$ can be obtained by varying the production conditions. The average particle diameter of the silica particles as calculated from the specific surface area is about 5 to 200 nm, but normally the particles exist as aggregates of at least 1 μm in size. Wet silica, also called white carbon, can normally be produced by neutralizing sodium silicate with a mineral acid to precipitate the silica in a solution. They can also be produced by a sol-gel method in which the sodium silica is neutralized with an acid instead of a mineral acid. Silica particles with a specific surface area in the range of about 50 to 1000 $m^2/g$ can also be obtained in a wet process by varying the production conditions. Particles having an average particle diameter suited to the intended use can be selected from the various silica particles described above and used as the hydrophilic silica particles to be hydrophobically treated. Dry silica particles are preferred from the standpoint of availability.

The hydrophobic treatment of the hydrophilic silica particles is not particularly limited, and may be performed by a method known in the technical field, but preferably the hydrophobic treatment is performed using a trimethylsilylating agent. A trimethylsilylating agent provides strong water repellency that can be maintained over a long period of time because it resists decomposition. The trimethylsilylating agent is not particularly limited, and an agent known in the field may be used. Examples of trimethylsilylating agents include trimethylsilanol, trimethyl methoxysilane, trimethyl chlorosilane, aminomethyl trimethylsilane, hexamethyl disilazane, dimethylamino trimethylsilane, diethylamino trimethylsilane and the like. Of these, hexamethyl disilazane is preferred. These triemthylsilylating agents may be used individually, or a combination of two or more may be used.

The average particle diameter of the hydrophobic silica particles 13 is not particularly limited, but is preferably at least 5 nm and not more than 30 nm. The average particle diameter of the hydrophobic silica particles 13 here is the value of the average particle diameter of the primary particles of the hydrophobic silica particles 13 as measured with a laser light scattering-type or dynamic light scattering-type particle size distribution meter. If the average particle diameter of the hydrophobic silica particles 13 is less than 5 nm, they are not able to adequately form fine relief structures on the surface of the coating film 10, and the desired water repellency may not be obtained. If the average particle diameter of the hydrophobic silica particles 13 exceeds 30 nm, on the other hand, the surface relief structures become too large, which not only makes the coating film 10 less durable but can also increase the light scattering of the coating film 10 and detract from the design properties of the substrate 11.

The content of the hydrophobic silica particles 13 in the coating composition of this embodiment is preferably at least 0.5 mass % and not mare than 30 mass %, or more preferably at least 1 mass % and not more than 25 mass %. If the content of the hydrophobic silica particles 13 is less than 0.5 mass %, they cannot form adequate relief structures on the surface of the coating film 10, and the desired water repellency way not be obtained. On the other hand, a content in excess of 30 mass % of the hydrophobic silica particles 13 may not only make the coating film 10 less durable, but can also increase the light scattering of the coating film 10 and detract from the design properties of the substrate 11.

The mass ratio of the fluorine resin 14 and hydrophobic silica particles 13 in the coating composition of this embodiment is not particularly limited, but is preferably 50:50 to 90:10, or more preferably 60:40 to 80:20. With such a mass ratio, it is possible to obtain a good balance between the relief structures formed by the hydrophobic silica particles 13 and, the binder effect of the fluorine resin 14.

The water-soluble organic solvent used in the coating composition of this embodiment not only dissolves the fluorine resin 14, but also serves to make the coating composition non-hazardous because it has a high flash point. The flash point of the water-soluble organic solvent is at least 80° C. and not more than 200° C., or preferably at least 90° C. and not more than 180° C. If the flash point of the water-soluble organic solvent is less than 80° C., there are restrictions on the method of handling the coating composition. If the flash point of the water-soluble organic solvent exceeds 200° C., on the other hand, mass productivity declines because the drying time of the coating composition is longer. The flash point here is the minimum temperature at which a substance can volatilize and form a flammable mixture with air. This can be measured for example by a flash point measurement method using a tag closed type flash point measuring instrument. Because the organic solvent with a high flash point and water constitute the liquid phase of the coating composition, it is not a hazardous substance. Thus, explosion-proof equipment and explosion prevention measures are unnecessary in the process of forming the coating film 10 using the coating composition of this embodiment. For the organic solvent to be water-soluble means that it has a solubility of at least 80 mass % in water. If the solubility of the water-soluble organic solvent in water is less than 80 mass %, this is not desirable because aggregation and the like can occur due to the reduced compatibility with water.

Specific examples of the water-soluble organic solvent include glycols such as ethylene glycol, diethylene glycol and triethylene glycol, monoalkyl ethers of ethylene glycol, such as ethylene glycol monobutyl ether, ethylene glycol monopentyl ether, ethylene glycol monohexyl ether, ethylene glycol monoocytl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, diethylene glycol monoocytl ether, triethylene glycol monomethyl ether, triethylene glycol monoethyl ether, triethylene glycol monopropyl ether, triethylene glycol monobutyl ether and triethylene glycol monopentyl ether, dialkyl ethers of ethylene glycol, such as diethylene glycol dimethyl ether, diethylene glycol diethyl ether, diethylene glycol dibutyl ether, triethylene glycol dimethyl ether, triethylene glycol diethyl ether and triethylene glycol dibutyl ether, and glycol esters such as ethylene glycol monomethyl ether acetate, PMA (propylene glycol monomethyl ether acetate), diethylene glycol monobutyl ether acetate and diethylene glycol monoethyl ether acetate and the like. The water-soluble organic solvents may be used individually, or a combination of two or more may be used.

The content of the water-soluble organic solvent in the coating composition of this embodiment is preferably at least 50 mass % and not more than 95 mass %, or more preferably at least 60 mass % and not more than 90 mass %. If the content of the water-soluble organic solvent is less than 50 mass %, the coatability on the substrate 11 may be worse because the water content is higher. On the other hand, a water-soluble organic solvent content in excess of 95 mass % is not desirable for reasons of workability because the time required to dry the coating composition and form the coating film 10 is longer.

The water contained in the coating composition of this embodiment serves as a dispersion medium for the hydrophilic silica particles 12 while also serving to make the coating composition non-hazardous. Of course, water by itself is a nan-hazardous substance according to the Japanese Fire Services Act.

The water contained in the coating composition of this embodiment is not particularly limited, and deionized water or ion-exchange water car the like may be used. Preferably the water contains as few ionic impurities such as calcium ions and magnesium ions as possible. Bivalent and higher ionic impurities are preferably contained in the water in an amount of not mere than 200 ppm, or more preferably not more than 50 ppm.

The content of the water in the coating composition of this embodiment is preferably at least 1 mass % and not more than 30 mass %, or more preferably at least 5 mass % and not more than 25 mass % of the coating composition. A water content of less than 1 mass % is not desirable because ignition is more likely due to the content of the water-soluble organic solvent. A water content in excess of 30 mass %, on the other hand, is also not desirable because the hydrophobic silica particles 13 are more likely to aggregate, detracting from the stability of the coating composition. The content of the water is preferably adjusted according to the content of the water-soluble organic solvent, and in this case the water content is preferably adjusted so that no flash point is detected in tag closed type flash point measurement of the coating composition. In this way, there is no need to specify measures to deal with hazardous substances or explosions in the embodiment during coating operations or when large quantities of the coating composition are stored and transported, and no need to control temperature and ventilation.

Flat fine particles forming a card house-like aggregate structure can also be added in the coating composition of this embodiment to improve the water repellency of the coating film 10.

The flat fine particles are plate-shaped, scale-shaped, strip-shaped or disc-shaped fine particles or the like, in which the aspect ratio of the pinacoid face to the end face of the fine particles is at least 10. If the aspect, ratio of the flat fine particles is less than 10, this means that they are closer to a bar or needle shape, which is undesirable because they are less likely to form card house-like aggregate structures, and may not be useful for improving water repellency. The average particle diameter of the primary particles of the flat fine particles is preferably at least 1 μm and not more than 100 μm, or more preferably at least 1 μm and not more than 80 μm. The particle diameter of the flat fine particles is its length in the longitudinal direction. If the average particle diameter of the primary particles of the flat fine particles is less than 1 μm, the relief structures necessary for improving water repellency may not be obtained, which is undesirable. If the average particle diameter of the primary particles of the flat fine particles exceeds 100 μm, on the other hand, the gaps between flat fine particles become much larger than the liquid droplets, and a coating film 10 with the desired water repellency may not be obtained, which is undesirable. In the present invention, the average particle diameter of the primary particles of the flat fine particles is a value measured by the dynamic light scattering method.

The average particle diameter of flat fine particles in an aggregated state is preferably at least 1 μm and not more than 300 μm. If the average particle diameter of the flat fine particles in an aggregated state is less than 1 μm, the flat fine particles may not form the relief structures necessary for improving water repellency, which is undesirable. If the average particle diameter of the flat fine particles in an aggregated state exceeds 300 μm, on the other hand, fibers and other contaminating particles floating in the air may catch on the particles, which is undesirable.

Examples of flat fine particles that form card house-like structures include smectite, tobermorite, bentonite, kaolin, mica, boehmite, aluminum, alumina, silica, calcium silicate, calcium carbonate, silicate minerals, alumina, silica, calcium carbonate, boron nitride, graphene, titanium oxide, hydroxide compounds, carbonate compounds, phosphate compounds, silicate compounds, titanate compounds and the like.

Specific examples of such flat fine particles include Tobermorite TJ (Japan Insulation Co., Ltd.), Cerasur® BMF (Kawai Lime Industry Co., Ltd.), Cerasure BMM (Kawai Lime Industry Co., Ltd.), Cerasur BMT (Kawai Lime Industry Co., Ltd.), Cerasur BMN (Kawai Lime Industry Co., Ltd.), Sunlovely® (AGC Si-Tech Co., Ltd.), Terracess® (Otsuka Chemical Co., Ltd.), "Aluminum paste" (Toyo Aluminum K.K.); Serath® (Kinsei Matec Co., Ltd.), Silkyflake® (Nippon Sheet Glass Co., Ltd.), Glasflake® (Nippon Sheet Glass Co., Ltd.), Micromica (Co-op Chemical Co., Ltd.), Somasif® (Co-op Chemical Co., Ltd.), Lucentite® (Co-op Chemical Co., Ltd.), "SEN" (Showa Denko K.K.), Denka boron nitride®(Denki Kagaku Kogyo Kabushiki Kaisha), "PS35-A" (New Lime Co., Ltd.) and "PS15-A" (New Lime Co., Ltd.).

When flat fine particles that form a card house-like aggregate structure are added, the added amount is preferably at least 0.5 mass % and not more than 3.0 mass % of the coating composition.

The coating composition of this embodiment can be produced by compounding the hydrophobic silica particles 13 and the fluorine resin 14 in a water-soluble organic solvent that has a flash point of at least 100° C. and not more than 200° C. and dissolves a fluorine resin, followed by a dispersion treatment to obtain a first agent, and then further compounding water and the hydrophilic silica particles 12 in the first agent, followed by a dispersion treatment to obtain a second agent.

The dispersion treatment method to prepare the first agent is not particularly limited, but may be for example a high-pressure dispersion treatment method using a commercial high-pressure disperser. Example of commercial high-pressure dispersers include a Nanomizer (Yoshida Kikai Co., Ltd.), Microfluidizer (MFIC Corp.), Ultimizer System (Sugino Machine Limited), noiseless high-pressure emulsifying disperser (Beryu Corp.) and the like. These high-pressure dispersers can perform particle refinement by means of the strong shearing force produced in a flow channel when a substance to be treated is sucked in and passed through a narrow flow channel at high pressure, the impact force of collisions that occur between a fluid and the walls of the channel or within the fluid itself due to the design of the flow channel, and the cavitation caused when the fluid is expelled from the fine flow channel and the like.

When performing the high-pressure dispersion treatment, the pressure is not particularly limited but is preferably at least 10 MPa and not more than 400 MPa, or more preferably at least 20 MPa and not more than 350 MPa, or most preferably at least 30 MPa and not more than 300 MPa. The high-pressure dispersion treatment can also be repeated 1 to 100 times. One or more treatments here means that a substance that has already been subjected to the high-pressure dispersion treatment is then treated again, with one treatment being called one pass, two treatments two passes, and three treatments three passes. From the standpoint of productivity, the number of passes is preferably at least 1 and not more than 20, or more preferably at least 1 and not more than 10. The high-pressure dispersion treatment may also be accomplished by a circulation process, in which a liquid dispersion that has been processed in and expelled from a high-pressure dispenser is then returned directly to the raw material tank.

As the method of preparing the second agent, the first agent is preferably mixed in a dispenser with the water and the hydrophilic silica particles 12. A dispersion treatment using a commercial high-speed rotary disperser may also be performed. Examples of commercial dispersers include a T.K. Robomix (Primix Corporation), Planetary Mixer (Inoue Mfg., Inc.) and the like. When using such a commercial disperser, the conditions including rotating speed, peripheral blade speed and gap between the rotating body and the fixed part can be set appropriately according to the equipment used.

As a coating method using the coating composition of this embodiment, the coating composition described above can be coated and dried on the substrate 11 to form a coating film (water-repellent film) 10. The thickness of the coaling film 10 is preferably at least 0.2 µm and not more than 3.0 µm. If the thickness of the coating film 10 is less than 0.2 µm, sufficient adhesion may not be obtained with the substrate 11. If the thickness of the coating film 10 exceeds 3.0 µm, on the other hand, cracks and other defects are more likely to occur in the coating film 10, and not only may the desired water repellency not be obtained, but the coating film 10 any actually peel with the defects as starting points. The film thickness is the average of the measured values obtained by imaging cross-sections at any 5 locations in the coating film 10 formed on the substrate 11 at a magnification of 1,000 under a scanning electron microscope (SEM).

The static contact angle oil the surface of the coating film 10 with water is preferably at least 140° C. and not more than 170°. If the static contact angle is less than 140°, water droplets, frost, snow, ice and the like may adhere to the coating, and sufficient suppression effects may not be obtained, which is undesirable. If the static contact angle exceeds 170°, on the other hand, the hydrophobic silica particles 13 forming relief structures on the surface of the coating film 10 are likely to peel off. The static contact angle is a value measured by dropping a roughly 5 µL water droplet from the tip of a PTFE (polytetrafluoroethylene)-coated needle with an inner diameter of 0.1 mm onto the surface of the coating film 10 after it has been left for 1 hour at room temperature (25° C.), and measuring the contact angle with a contact angle meter (Kyowa Interface Science Co., Ltd., CX-150).

The substrate 11 on which the coating film 10 is formed is not particularly limited, and components of various products requiring water-repellency may be used. Examples of such components include heat exchangers and exhaust fan blades of air conditioners and the like. The material of the substrate 11 tray be a plastic such as polypropylene, polystyrene, ABS resin or ASG resin, a metal such as stainless steel or aluminum, or glass or the like.

The method of coating the coating composition is not particularly limited, and a method known in the technical field may be used. Examples of coating methods include brush coating, spray coating, immersion and the like. In particular, to form a coating film 10 without irregularities it is desirable to first coat the substrate 11 by immersing it in the coating composition, and then remove excess coating opposition with a flow of air. Instead of a flow of air, the excess coating composition can also be removed by rotating the substrate 11. Coating irregularities can also be suppressed by using such a method.

The drying method is not particularly limited, and the coating can be dried at room temperature or heated and dried. When it is dried at room temperature, the drying time is shorter if it is dried in a flow of air. Heating and drying can be accomplished either by blowing hot air or by heating in an oven.

Second Embodiment

Figure 2:
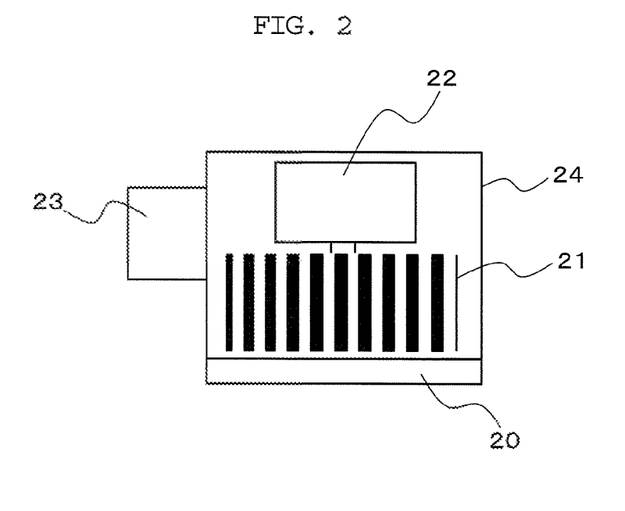
FIG. 2 is a model cross-section of an exhaust fan of a second embodiment.

FIG. 2 is a model cross-section of an exhaust fan of the second embodiment of the invention. In FIG. 2, the exhaust fan comprises an intake port 20, fan blades 21 disposed in the path of the gas taken in through the intake port 20, a motor 22 that rotates the fan blades 21, an exhaust port 23 for exhausting gas by means of a flow of gas formed by the fan blades 21 rotated by the motor 22, and a case 24 connected to the exhaust port 23 and intake port 20 and housing the fan blades 21. A coating film 10 obtained by coating and drying the coating composition explained in the first embodiment is then provided on the surface of at least one of the intake port 20, the fan blades 21, the motor 22, the exhaust port 23 and the case 24. The method for forming the coating film 10 is as explained in the first embodiment.

The formed coating film 10 is optimal for use in various members of an exhaust fan because it exhibits excellent water repellency and anti-fouling performance even in high humidity environments. Consequently, an exhaust fan of the second embodiment having various members with the coating film 10 formed thereon can effectively prevent exhaust fan performance degradation and adhesion of water, dirt and the like to the exhaust fan.

Third Embodiment

Figure 3:
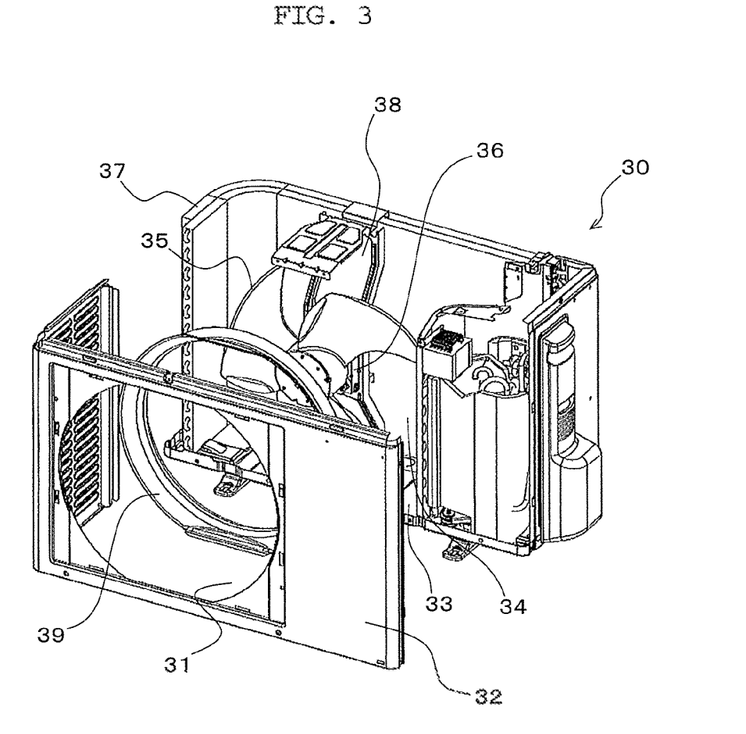
FIG. 3 is a disassembled perspective view of part of the outdoor unit of an air conditioner of a third embodiment.

FIG. 3 is a disassembled perspective view of part of the outdoor unit of an air conditioner of the third embodiment. In FIG. 3, the outdoor unit 30 of the air conditioner is provided with a case having a bottom panel 33 and a front panel 32 with an opening 31 formed therein, a fan 35 installed in a blower chamber 34 formed inside the case, a fan motor 36 that is provided in the blower chamber 34 and drives the fan 35, an outdoor heat exchanger 37 provided on the blower chamber 34, a fan motor support plate 38 that is provided in the blower chamber 34 on the front side of the outdoor heat exchanger 37 and supports the fan motor 36, and a bell mouth 39 projecting backwards from the edge of the opening 31. A coating film 10 obtained by coating and drying the coating composition explained in the first embodiment is then provided on the surface of at least one of the case, the fan 35, the outdoor heat exchanger 37, the fan motor 56 and the fan motor support plate 38. The method for forming the coating film 10 is as explained in the first embodiment.

An air conditioner provided with an outdoor unit of the third embodiment having various parts with the coating film 10 formed thereon can maintain a constant clean state because adhesion of snow and frost can be effectively suppressed. In particular, if the coating film 10 is formed an the surface of the fan 35 (preferably on the anterior surface of the fan 35), ice and snow can be easily spun off into the blower chamber 34 by the centrifugal force of rotation. Furthermore, even if frost on the outdoor heat exchanger 37 is melted during defrosting to produce water vapor that then adheres to the boss and blades of the fan 35, this can be easily spun off by the centrifugal force of rotation. This eliminates the problem of ice forming on the fan 35 due to defrosting. Moreover, sucked-in snow that accumulates on the boss and blades of the fan 35 can also be easily spun off. Even when the fan 35 is stopped, snow easily slips off onto the bottom panel 33 because the coating film 10 has low surface energy. Adhesion of ice and snow to the fan 35 can be suppressed as a result. When ice and snow accumulate in a large mass on the fan 35, the rotation of the fan 35 becomes eccentric, potentially damaging the screw fixtures of the fan motor 36 through the force of rotation or damaging the bottom part of the fan motor support plate 38, and these problems can be avoided in this way. Moreover, when ice and snow accumulate on the fan 35 the desired air flow may not be detained due to the increased weight, detracting from the energy savings, and these problem can be avoided in this way.

EXAMPLES

The invention is explained in detail below using examples and comparative examples, but the invention is not limited by these examples.

Example 1

Hydrophobic silica particles (average particle diameter 12 nm, Nippon Aerosil Co., Ltd., R974) and a fluoroethylene vinyl ester fluorine resin (Dainippon Ink and Chemicals, Fluonate FEM-600) were compounded and mixed in tetraethylene glycol dimethyl ether (flash point 141° C., dissolved at any ratio in water), and subjected to two passes of high-pressure dispersion treatment under a pressure of 150 MPa with a high-pressure disperser (Yoshida Kikai Co., Ltd. Nanomizer YSNM-1500AR) to prepare a first agent. The first agent was then mixed and dispersed with water and hydrophilic silica particles (average particle diameter 10 nm, Nissan Chemical Co., Ltd., Snowtex ST-30) to obtain the coating composition of Example 1. The composition of the resulting coating composition is shown in Table 1.

Example 2

The coating composition of Example 2 was obtained as in Example 1 except that the composition of the coating composition was changed as shown in Table 1.

Example 3

The coating composition of Example 3 was obtained as in Example 1 except that the composition of the coating composition was changed as shown in Table 1.

Example 4

Hydrophobic silica particles (average particle diameter 12 nm, Nippon Aerosil Co., Ltd., R974) and a fluoroethylene vinyl ester fluorine resin (Dainippon Ink and Chemicals, Fluonate FEM-600) were compounded and mixed in tetraethylene glycol dimethyl ether, and subjected to two passes of high-pressure dispersion treatment under a pressure of 150 MPa with a high-pressure disperser (Yoshida Kikai Co., Ltd. Nanomizer YSNM-1500AR) to prepare first agent. The first agent was then missed and dispersed with water, hydrophilic silica particles (average particle diameter 10 nm, Nissan Chemical Co., Ltd., Snowtex ST-30) and flat fine particles (average particle diameter 30 μm in aggregated state, Kawai Lime Industry Co., Ltd., Cerasur BMF), to obtain the coating composition of Example 4. The composition of the resulting coating composition is shown in Table 1.

Example 5

The coating composition of Example 5 was obtained as in Example 1 except that the composition of the coating composition was changed as shown in Table 1.

Comparative Example 1

The coating composition of Comparative Example 1 was obtained as in Example 1 except that no fluorine resin was compounded.

Comparative Example 2

The coating composition of Comparative Example 2 was obtained as in Example 1 except that no hydrophobic silica particles were compounded.

Comparative Example 3

The coating composition of Comparative Example 2 was obtained as in Example 1 except that no hydrophilic silica particles were compounded.

Comparative Example 4

Hydrophobic silica particles (average particle diameter 12 nm, Nippon Aerosil Co., Ltd., R974) and a fluoroethylene vinyl ester fluorine resin (Dainippon Ink and Chemicals, Fluonate FEM-600) were expounded and mixed in tetraethylene glycol dimethyl ether, and subjected to two passes of high-pressure dispersion treatment under a pressure of 150 MPa with a high-pressure disperser (Yoshida Kikai Co., Ltd. Nanomizer YSNM-1500AR) to prepare the coating composition of Comparative Example 4. The composition of the resulting coating composition is shown in Table 1.

TABLE 1

|  | Fluorine resin | Hydrophobic silica particles | Hydrophilic silica particles | Flat fine particles | Water-soluble organic solvent | Water |
|---|---|---|---|---|---|---|
| Ex. 1 | 3.0 mass % | 3.0 mass % | 0.001 mass % | — | 64.0 mass % | Remainder |
| Ex. 2 | 3.0 mass % | 3.0 mass % | 1.200 mass % | — | 64.0 mass % | Remainder |
| Ex. 3 | 3.0 mass % | 3.0 mass % | 0.0008 mass % | — | 64.0 mass % | Remainder |
| Ex. 4 | 3.0 mass % | 3.0 mass % | 0.001 mass % | 1.0 mass % | 64.0 mass % | Remainder |
| Ex. 5 | 3.0 mass % | 3.0 mass % | 1.0 mass % | — | 64.0 mass % | Remainder |
| Comp. Ex. 1 | — | 3.0 mass % | 0.001 mass % | — | 67.0 mass % | Remainder |
| Comp. Ex. 2 | 3.0 mass % | — | 0.001 mass % | — | 67.0 mass % | Remainder |
| Comp. Ex. 3 | 3.0 mass % | 3.0 mass % | — | — | 64.0 mass % | Remainder |
| Comp. Ex. 4 | 3.0 mass % | 3.0 mass % | — | — | 94.0 mass % | — |

The coating compositions of Examples 1 to 5 and Comparative Examples 1 to 4 were subjected to Class 4 hazardous material evaluation testing. Using an analysis flow sheet based on Article 9, Section 4 of the Japanese Fire Services Act (Jul. 24, 1948 Law No. 186), material that did not exhibit a flash point in tag closed type flash point measurement was evaluated as non-hazardous, and material that exhibited a flash point was evaluated as hazardous.

Next, rising 100 mm ×30 mm ×1 mm plastic (ABS resin) substrates, the substrates were coated by immersing them in the coating compositions of Examples 1 to 5 and Comparative Examples 1 to 4, and excess coating exposition was then removed with a flow of air to form coating films. The initial contact angles, snow adhesion suppression performance and anti-fouling performance of the coating films were then evaluated.

The static contact angles were measured by dropping a roughly 5 µL water droplet from the tip of a PTFE (polytetrafluoroethylene)-coated needle with an inside diameter of 0.1 mm onto the surface of each coating film after it had been left for 1 hour at room temperature (25° C.), and measuring the contact angle with a contact angle meter (Kyowa Interface Science Co. Ltd., CX-150). The results are shown in Table 2.

The snow adhesion suppression properties were evaluated by an ice adhesion force test. The test was performed by the shear method, and the load during measurement was controlled by adjusting the rotational speed of the drive motor to control the load speed.

This was output by a load cell to a recorder via a dynamic strain gauge. The procedures were as follows. First, a stainless steel ring for making ice (height 15 mm, diameter 25.4 mm) was placed on the surface of the coating film, and thoroughly cooled to a predetermined temperature of −10° C., after which 5° C. distilled water was poured in and left for 1 hour to freeze ice on the surface of the coating film. Load was then applied to the stainless steel ring from the shearing direction to separate the coating film and the frozen surface, and the load at that time was divided by the adhesion area (internal area of stainless steel ring) to obtain the "ice adhesion force" (kgf/cm$^2$), which was evaluated according to the following standards. The results are shown in Table 2.

1: Ice adhesion force less than 0.1 kgf/cm$^2$
2: Ice adhesion force at least 0.1 kgf/cm$^2$ and less than 0.5 kgf/cm$^2$
3: Ice adhesion force at least 0.5 kgf/cm$^2$ and less than 1.5 kgf/cm$^2$
4: Ice adhesion force at least 1.5 kgf/cm$^2$ and less than 2.5 kgf/cm$^2$
5: Ice adhesion force at least 2.5 kgf/cm$^2$ The anti-fouling performance was evaluated by evaluating adhesion of dust, which is a hydrophilic contaminant. JIS Kanto loam test dust with a center particle diameter of 1 to 3 µm was blown onto the coating film with air under conditions of 25° C., 50% RH, and then collected with mending tape (Sumitomo 3M Limited), and absorbance (wavelength 550 nm) was measured with a spectrophotometer (Shimadzu Corporation, UV-3100 PC) and evaluated according to the following standards. The results as shown in Table 2.

1: Absorbance less than 0.1
2: Absorbance at least 0.1 and less than 0.2
3: Absorbance at least 0.2 and less than 0.3
4: Absorbance at least 0.3 and less than 0.4
5: Absorbance at least 0.4

TABLE 2

|  | Hazardous material evaluation | Contact angle (°) | Ice adhesion force | Absorbance |
|---|---|---|---|---|
| Ex. 1 | Non-hazardous | 155 | 2 | 2 |
| Ex. 2 | Non-hazardous | 152 | 3 | 2 |
| Ex. 3 | Non-hazardous | 152 | 2 | 3 |
| Ex. 4 | Non-hazardous | 156 | 1 | 1 |
| Ex. 5 | Non-hazardous | 150 | 2 | 2 |
| Comp. Ex. 1 | Non-hazardous | 102 | 5 | 3 |
| Comp. Ex. 2 | Non-hazardous | 105 | 4 | 5 |
| Comp. Ex. 3 | Non-hazardous | 133 | 4 | 5 |
| Comp. Ex. 4 | Hazardous | 145 | 3 | 3 |

As shown in Table 2, the coating films formed from the coating compositions of Examples 1 to 5 exhibited good initial water-repellency, and low ice adhesion force. These coating films were also able to provide strong anti-fouling performance.

Of the coating films, the one formed from the coating composition of Example 4 had the highest water-repellency, snow adhesion suppression performance and anti-fouling performance. This is believed to be because a film without cracks was formed by the fluorine resin, the surface fine relief structures produced by the hydrophobic silica particles and flat fine particles, and the hydrophilic silica particles.

By contrast, in Comparative Example 1 containing no fluorine resin and Comparative Example 2 containing no hydrophobic silica particles, the contact angles were such lower and adequate super water repellency could not be obtained. In Comparative Example 3 containing no hydrophilic silica particles, cracks occurred in the coating film, the contact angle was lower and the anti-fouling performance was worse. Because the coating composition of Comparative Example 4 contained no water, it was rated as a hazardous material in the Class 4 evaluation test. Consequently, this coating composition has inferior handling properties because it could require temperature or ventilation control or measures to deal with hazardous substances and dust in the environment during storage, transport or uses.

As can be seen from these results, the present invention can provide a coating composition that is easy to handle and can form a coating film with few cracks that can confer super water repellency.

Example 6

The coating composition of Example 6 was obtained as in Example 1 except that the composition of the coating composition was changed as shown in Table 3.

Example 7

The coating composition of Example 7 was obtained as in Example 4 except that the composition of the coating composition was changed as shown in Table 3.

Comparative Example 5

The coating composition of Comparative Example 5 was obtained as in Example 4 except that the composition of the coating composition was changed as shorn in Table 3.

1: Dust adhesion weight less than 1 g
2: Dust adhesion weight at least 1 g and less than 2 g
3: Dust adhesion weight at least 2 g and less than 3 g
4: Dust adhesion weight at least 3 g and less than 4 g
5: Dust adhesion weight at least 4 g

TABLE 4

|  | Hazardous material evaluation | Contact angle (°) | Adhesion weight |
|---|---|---|---|
| Ex. 6 | Non-hazardous | 152 | 2 |
| Ex. 7 | Non-hazardous | 148 | 1 |
| Comp. Ex. 5 | Non-hazardous | 128 | 4 |

As shown in Table 4, the coating films formed from the coating compositions of Example 6 and 7 not only exhibited good initial water repellency, but also had strong anti-fouling performance as shown by the small dust adhesion weight.

By contrast, in Comparative Example 5 containing no hydrophobic silica particles the contact angle was such lower, and adequate super water repellency was not obtained. Moreover, this coating film also had poorer anti-fouling performance.

Example 8

The coating composition of Example 8 was obtained as in Example 1 except that the composition of the coating exposition was changed as shown in Table 5.

TABLE 3

|  | Fluorine resin | Hydrophobic silica particles | Hydrophilic silica particles | Flat fine particles | Water-soluble organic solvent | Water |
|---|---|---|---|---|---|---|
| Ex. 6 | 2.5 mass % | 2.5 mass % | 0.002 mass % | — | 64.0 mass % | Remainder |
| Ex. 7 | 2.5 mass % | 2.5 mass % | 0.002 mass % | 1.0 mass % | 64.0 mass % | Remainder |
| Comp. Ex. 5 | 2.5 mass % | — | 0.002 mass % | 1.0 mass % | 64.0 mass % | Remainder |

The coating compositions of Examples 6 and 7 and Comparative Example 5 were subjected to hazardous material evaluation as in Example 1 and the like. The results are shown in Table 4.

Next, the coating expositions were coated on exhaust fan blades (polypropylene Sirocco fan blades), and coating films were formed by 30 seconds of rotation at 3,000 rpm. The anti-fouling performance of the coating films was then evaluated by measuring dust adhesion weight. Specifically, the exhaust fan blades were installed in a VD-15ZFVC duct exhaust fan, and a mixture of Kanto loam and cotton lint was blown in for 10 minutes under conditions of 25° C., 90% RH, after which dust adhesion weight was measured and evaluated according to the following standards. The results are shown in Table 4.

Example 9

The coating composition of Example 3 was obtained as in Example 4 except that the composition of the coating exposition was changed as shown in Table 5.

Comparative Example 6

The coating composition of Comparative Example 6 was obtained as in Example 4 except that the composition of the coating composition was changed as shown in Table 5.

TABLE 5

|  | Fluorine resin | Hydrophobic silica particles | Hydrophilic silica particles | Flat fine particles | Water-soluble organic solvent | Water |
|---|---|---|---|---|---|---|
| Ex. 8 | 2.0 mass % | 2.5 mass % | 0.002 mass % | — | 64.0 mass % | Remainder |
| Ex. 9 | 2.0 mass % | 2.5 mass % | 0.002 mass % | 1.0 mass % | 64.0 mass % | Remainder |
| Comp. Ex. 6 | 2.0 mass % | — | 0.002 mass % | 1.0 mass % | 64.0 mass % | Remainder |

The coating compositions obtained in Examples 8 and 9 and Comparative Example 6 were subjected to hazardous material evaluation as in Example 1 and the like. The results are shown, in Table 6.

Next, the coating compositions were coated on fans for outdoor units of air conditioners, and coating films were formed by 120 seconds of rotation at 100 rpm. The snow adhesion suppression properties of the coating films were then evaluated by measuring snow adhesion area. Specifically, the fans for outdoor units of air conditioners were installed in Mitsubishi Electric Co., Ltd. "Kirigamine®" MUZ-ZD2516 outdoor units, which were then placed in a snowfall testing location and operated for 24 tours, after which the area of snow adhering the fans was calculated, and evaluated according to the following standards. The results are shown in Table 6.

1: Snow adhesion area less than 1%
2: Snow adhesion area at least 1% and less than 10%
3: Snow adhesion area at least 10% and less than 50%
4: Snow adhesion area at least 50% and less than 80%
5: Snow adhesion area at least 80%

TABLE 6

|  | Hazardous material evaluation | Contact angle (°) | Snow adhesion area |
|---|---|---|---|
| Ex. 8 | Non-hazardous | 158 | 3 |
| Ex. 9 | Non-hazardous | 167 | 1 |
| Comp. Ex. 6 | Non-hazardous | 125 | 4 |

As shown in Table 6, the coating films formed from the coating compositions of Examples 8 and 9 had good initial water repellency, and exhibited strong snow adhesion suppression performance as shown by the small snow adhesion areas.

By contrast, in Comparative Example 6 containing no hydrophobic silica particles the contact angle was such lower, and adequate super water repellency was not obtained as a result. Also, the snow adhesion area was greater with this coating film.

It can be seen from these results that with the present invention it is possible to form a coating film that is easy to handle and provides super water repellency with few cracks, and to provide a product with excellent anti-fouling performance and snow adhesion suppression performance.

The priority claim for this international application is based on Japanese Patent Application No. 2015-098887 submitted on May 14, 2015, and the entire content of that Japanese patent application is incorporated into this international application.

EXPLANATION ON NUMERALS

10 Coating film
11 substrate
12 Hydrophilic silica particles
13 Hydrophobic silica particles
14 Fluorine resin
20 Intake port
21 Fan blades
22 Motor
23 Exhaust port
24 Case
30 Outdoor unit
31 Opening
32 Front panel
33 Bottom panel
34 Blower chamber
35 Fan
36 Fan motor
37 Outdoor heat exchanger
38 Fan motor support plate
39 Bell mouth

The invention claimed is:

1. A coating film formed from a coating composition comprising:
water;
a water-soluble organic solvent that has a flash point of at least 80° C. and not more than 200° C. and dissolves a fluorine resin;
a fluorine resin;
hydrophilic silica particles; and
hydrophobic silica particles,
wherein a thickness of the coating film is at least 0.2 μm and not more than 3.0 μm.

2. The coating film formed from the coating composition of claim 1, wherein a static contact angle of the surface of the coating film with water is at least 140° and not more than 170°.

3. A coating film, comprising:
a layer in which hydrophilic silica particles are agglomerated on the surface of a substrate;
hydrophobic silica particles dispersed and arranged on the layer in which the hydrophilic silica particles are aggregate; and
a fluorine resin covering the layer in which the hydrophilic silica particles are aggregated and the hydrophobic silica particles.

4. The coating film of claim 1, wherein the hydrophilic silica particles are contained in an amount of at least 0.001 mass % and not more than 1 mass % of the coating composition.

5. The coating film of claim 1, wherein an average particle diameter of the hydrophilic silica particles is at least 5 nm and not more than 30 nm.

6. The coating film of claim 1, wherein water is contained in an amount of at least 1 mass % and not more than 30 mass % of the coating composition used to form the coating film.

7. The coating film of claim 1, wherein the coating composition used to form the coating film further comprises flat fine particles that form a card house-like aggregate structure.

* * * * *